US010385591B2

(12) United States Patent
Yang

(10) Patent No.: US 10,385,591 B2
(45) Date of Patent: Aug. 20, 2019

(54) EAS TAG WITH SHACKLE

(76) Inventor: Xiao Hui Yang, Saratoga, CA (US)

( * ) Notice: Subject to any disclaimer, the term of this patent is extended or adjusted under 35 U.S.C. 154(b) by 1472 days.

(21) Appl. No.: 13/452,324

(22) Filed: Apr. 20, 2012

(65) Prior Publication Data

US 2012/0267436 A1 Oct. 25, 2012

Related U.S. Application Data

(60) Provisional application No. 61/477,580, filed on Apr. 20, 2011.

(51) Int. Cl.
*G06K 19/06* (2006.01)
*E05B 73/00* (2006.01)
*G08B 13/24* (2006.01)
*E05B 67/14* (2006.01)

(52) U.S. Cl.
CPC ...... *E05B 73/0017* (2013.01); *G08B 13/2434* (2013.01); *E05B 67/14* (2013.01); *E05B 73/0052* (2013.01)

(58) Field of Classification Search
CPC ...................................................... E05B 67/06
USPC ................................................ 235/492, 487
See application file for complete search history.

(56) References Cited

U.S. PATENT DOCUMENTS 4,811,578 A * 3/1989 Masoncup et al. ........... 70/38 B
5,404,735 A 4/1995 Hsieh
5,406,257 A 4/1995 Saito
5,524,463 A 6/1996 Schenkel et al.
5,587,702 A 12/1996 Chadfield
5,594,228 A * 1/1997 Swartz ..................... G06K 7/10 235/383
5,627,520 A 5/1997 Grubbs et al.
5,727,405 A 3/1998 Cromwell
5,786,759 A 7/1998 Ling
5,856,782 A 1/1999 Sasagawa et al.
5,969,613 A 10/1999 Yeager et al.
6,188,320 B1 2/2001 Kolton et al.
6,326,890 B1 12/2001 Costa
6,624,753 B2 9/2003 Elston
6,753,821 B2 6/2004 Yang et al.
6,933,847 B2 8/2005 Feibelman
6,958,698 B2 10/2005 Maloney
7,005,989 B2 2/2006 Benoit et al.
7,129,841 B2 10/2006 Feibelman
7,134,302 B2 11/2006 Gorst
7,183,914 B2 2/2007 Norman et al.
7,190,272 B2 3/2007 Yang et al.
(Continued)

*Primary Examiner* — Daniel St. Cyr
(74) *Attorney, Agent, or Firm* — Brian W. Foxworthy; Robert R. Waters; Waters Law Group, PLLC

(57) ABSTRACT

An EAS tag has a housing and a shackle. The shackle has a first segment with a first end and a second segment with a second end. The first segment of the shackle is slidably mounted in the housing while the second segment moves in and out of the housing in accord with the first segment. When the second segment is out of the housing, the shackle can be placed through an aperture in an object to be protected or around a portion of an object to be protected. The shackle is then slid into the housing so that the second segment inserts into the housing. A clutch within the housing prevents the shackle from being shifted until the clutch is released. The housing carries at least a passive EAS element. More advanced EAS electronic elements may also be carried in the housing.

20 Claims, 11 Drawing Sheets

(56) References Cited

U.S. PATENT DOCUMENTS

| | | | |
|---|---|---|---|
| 7,286,055 B2 | 10/2007 | Girvin et al. | |
| 7,334,443 B2 | 2/2008 | Meekma et al. | |
| 7,382,250 B2 | 6/2008 | Marcelle et al. | |
| 7,400,254 B2 * | 7/2008 | Yang | E05B 73/0017 340/541 |
| 7,474,209 B2 | 1/2009 | Marsilio et al. | |
| 7,474,222 B2 | 1/2009 | Yang et al. | |
| 7,501,957 B1 * | 3/2009 | Plottke | 340/572.8 |
| 7,518,521 B2 | 4/2009 | Feibelman et al. | |
| 7,595,733 B2 | 9/2009 | Spagna | |
| 7,685,850 B2 | 3/2010 | Nilsson | |
| 7,921,682 B1 | 4/2011 | Chang | |
| 7,948,359 B2 * | 5/2011 | Marcelle et al. | 340/5.64 |
| 7,999,656 B2 * | 8/2011 | Fisher | G07C 9/00103 340/5.73 |
| 2008/0036596 A1 | 2/2008 | Auerbach et al. | |
| 2009/0289798 A1 | 11/2009 | Yang | |
| 2010/0115632 A1 | 5/2010 | Tsuruga et al. | |
| 2010/0171621 A1 | 7/2010 | Yang | |
| 2010/0135239 A1 | 12/2010 | Yang | |
| 2010/0315237 A1 | 12/2010 | Yang | |
| 2010/0315238 A1 | 12/2010 | Yang | |
| 2011/0227706 A1 | 9/2011 | Yang | |

* cited by examiner

EAS TAG WITH SHACKLE

This application claims priority from U.S. Provisional Application No. 61/477,580, filed on Apr. 20, 2011. The entire disclosure contained in U.S. Provisional Application 61/477,580, including the attachments thereto, is incorporated herein by reference.

FIELD OF INVENTION

The present application is generally related to electronic article surveillance (EAS) tags that are attached to objects to be monitored. More specifically, the present application relates to EAS tags attachable by a shackle to items to be monitored. Also, the tags of the present application may be used with various electronic article surveillance (EAS) systems. These EAS systems may use interrogation zones and passive tag elements as well as utilizing tags and deactivators featuring wireless communication for deactivation and alarming, and featuring dynamic time-based passcode modification, and other tamper resistant features. The wireless communication may be radio frequency communication or optical communication, such as infrared.

BACKGROUND OF THE INVENTION

Electronic article surveillance systems have been used for many years as a means of deterring retail shoplifting in clothing stores, electronic stores, and a myriad of other retail establishments. Generally speaking, an EAS system will begin with a tag, consisting of a durable and reliable, yet small, sensor tag which is affixed to the article to be detected in such a way that it cannot be easily removed by a customer in the store. Usually, the system depends upon the feature that the attachment mechanism is constructed such that it can only be removed by the use of a specialized tool which is only in the possession of the authorized store personnel at the checkout register or exit port for the establishment. In the event that an EAS tag is not removed from a protected article prior to exiting the store, an alarm or other signal is activated.

In many commercially available EAS systems, one or more antennas are placed at the exits and entrances to the retail location. These antennas set up zones, sometimes referred to as interrogation zones, in which an EAS tag (or marker) may be sensed. At least one antenna serves the function of sending out what is called an interrogation signal. The markers on the merchandise are affected by this signal and will respond with a signal of their own. Either the same antenna that sends out the interrogation signal or other additional antennas can sense the signals from the markers. The most effective way to do this is by stopping the broadcast of the interrogation signal to listen for the signals emanating from the markers. If a marker is sensed within the zone created by the antennas, it is presumed that an article is being removed without purchase, and alarms are set off. These alarms may be audible alarms for general broadcast or the alarms may be silent alarms in the form of a light at a check-out counter or security station, etc. Additionally, some EAS tags have onboard audible alarm generators and can generate audible alarms by themselves. These tags may produce this audible alarm when onboard logic elements determine that the tag is being removed from the store, or when the larger EAS system communicates to the tag to alarm. The onboard logic elements and the larger EAS system may also cause the tag to cease to alarm under certain situations.

An assortment of attachment mechanisms are available in the prior art. One of the more common and more successful attachment mechanisms is an EAS tag consisting of a tack which is used to physically pin the protected article to the EAS tag base. The tag base is usually constructed of a hard and durable plastic and is generally in the neighborhood of three inches long. The tag serves as a housing for an electronic signal generation means secured within the housing. The housing is designed to be resistant to tampering. A cap on the tack keeps the tag attached to the article.

Another common and successful method of attaching tags, or transponders, is a lanyard. One end of the lanyard is fixed in the transponder and the other end is capable of being inserted into an aperture in the transponder where it can be retained by the transponder. The lanyard can pass through an aperture on the article to be protected or may be placed around an article in a position where it cannot be simply slid off the article. The lanyard is typically constructed of material that is very difficult to break or cut, but yet, is easy to bend into place. A variation on lanyard tags passes the unfixed end of the lanyard through the body of its tag to form a loop which may be adjusted onto an object by pulling the unfixed end. A clutch in the body prevents the lanyard loop from being enlarged unless the clutch is release by an authorized person. Some tags may form more than one loop.

A common device for releasably retaining both tack shafts and lanyards is a ball clutch mechanism. The ball clutch mechanism may be constructed to release the retained item after application of a magnetic force to the tag. Other clips and clamps may also be used. Other types of tags may employ vials of ink, which may break if the tag is physically bent, thereby destroying the benefit of the theft attempt.

While tack, lanyard, and other types of tags have found wide use in protecting objects, they must remain attached to a given object to protect it. A common manner of defeating an EAS tag is to forcibly remove the tag from the object being protected. A countermeasure employed with some EAS tags is the introduction of a switch which has its state changed and arms the tag when a tag is attached to an object to be protected. For example, in tags employing a tack, a switch is positioned on the tag at a location beneath the head of the tack. When the tack is inserted through an object, the object and the head of the tack bear upon the switch and change its state. Depending on the mechanism being used to attach the tag to an object, a switch can be positioned to have its state changed when the tag is attached to an object.

Associated devices may communicate with electronics within the EAS tag to add an additional step to the tag arming process. When the tag is attached to an object and the state of the switch changed, this change of state functions as confirmation that the tag is attached, and an authorized person can use an associated device to wirelessly communicate with the tag to complete the tag installation and arming process. Once armed, if a tag is forcibly removed, the switch's state again changes, and the electronics of the EAS tag determine that an alarm condition exists. The EAS tag can sound an audible alarm with an onboard audible alarm generator or wirelessly communicate an alarm to other elements of the EAS system.

While both tack attached tags and lanyard attached tags have achieved wide acceptance in the field, they have limitations as well. The tacks of the tack attached tags must pierce the article to be monitored. This is not always desirable or even possible. Lanyards may be cut. There is a need for additional methods of releasably attaching an EAS tag to an object to be monitored.

RELEVANT ART

U.S. Pat. No. 5,856,782 by Sasagawa, et al. is for a "Portable wire loop anti theft alarm with magnetic unlocking" In Sasagawa et al., a portable anti-theft monitor comprises a case; a detection conductive wire led out of said case, having a loop portion; an engaging member provided in said case so as to freely get it in and out, for engaging by catching the loop portion of said detection conductive wire in a state in which it has been pressed in said case; and a locking member for locking said engaging member in the state in which said engaging member has been pressed into said case, and for being attracted by a magnet to be moved in the unlocking direction.

U.S. Pat. No. 7,183,914 by Norman, et al. is for a "Hang tag with swivel attachment." A hang tag provides for the accommodation of electronic article surveillance (EAS) marker. The hang tag includes a housing for supporting the EAS marker therein. A securement head is provided for accommodating a securement strap for coupling the housing to an article which is to be protected. The head is coupled to the housing in such a fashion that it permits continuous rotation with respect to the housing to thwart and attempt to improperly sever the securement strap from the article.

U.S. Pat. No. 6,933,847 by Feibelman is for an "Anti-theft tag." The anti-theft security tag of Feibelman includes an engagement member having a first and second end securable within a housing for attachment to an article. The housing supports an electronic article surveillance marker and may include one or more channels for receiving and securing at least one crimping sleeve. The at least one crimping sleeve is sized to receive one end of the engagement member. A slot is disposed within the housing in alignment with the at least one crimping sleeve, and is sized to receive a crimping tool to crimp the sleeve and secure the wire to the article within the housing.

SUMMARY OF THE INVENTION

An EAS tag has a shackle and a housing. A first end of the shackle is slideably enclosed in the housing while a second end of the shackle may be received in the housing when the tag is attached to the protected object. The shackle may pass around a portion of the object or through an aperture in the object. When the tag is attached to an object, the shackle is passed around a portion of the object or through an aperture in the object, and the second end is inserted into the housing. As the second end of the shackle is inserted into the housing, the first end of the shackle slides deeper into the housing. As the first end slides deeper into the housing, a clutch engages the first end of the shackle and prevents the shackle from sliding outward from the housing until the clutch is released. In some embodiments, when the second end of the shackle is not engaged in the housing, the shackle may turn about the first end.

The housing encloses an electronics package. In some embodiments, the electronics package includes a passive EAS element that generates a signal when brought into an interrogation field. Other embodiments include a more sophisticated electronics package with a microprocessor, onboard power supply, and wireless communication elements along with other electronic components. The wireless communication elements communicate with components of the larger security system.

BRIEF DESCRIPTION OF THE DRAWINGS

Additional utility and features of the invention will become more fully apparent to those skilled in the art by reference to the following drawings, which illustrate some of the primary features of preferred embodiments.

DESCRIPTION OF THE EMBODIMENT(S)

Figure 1:
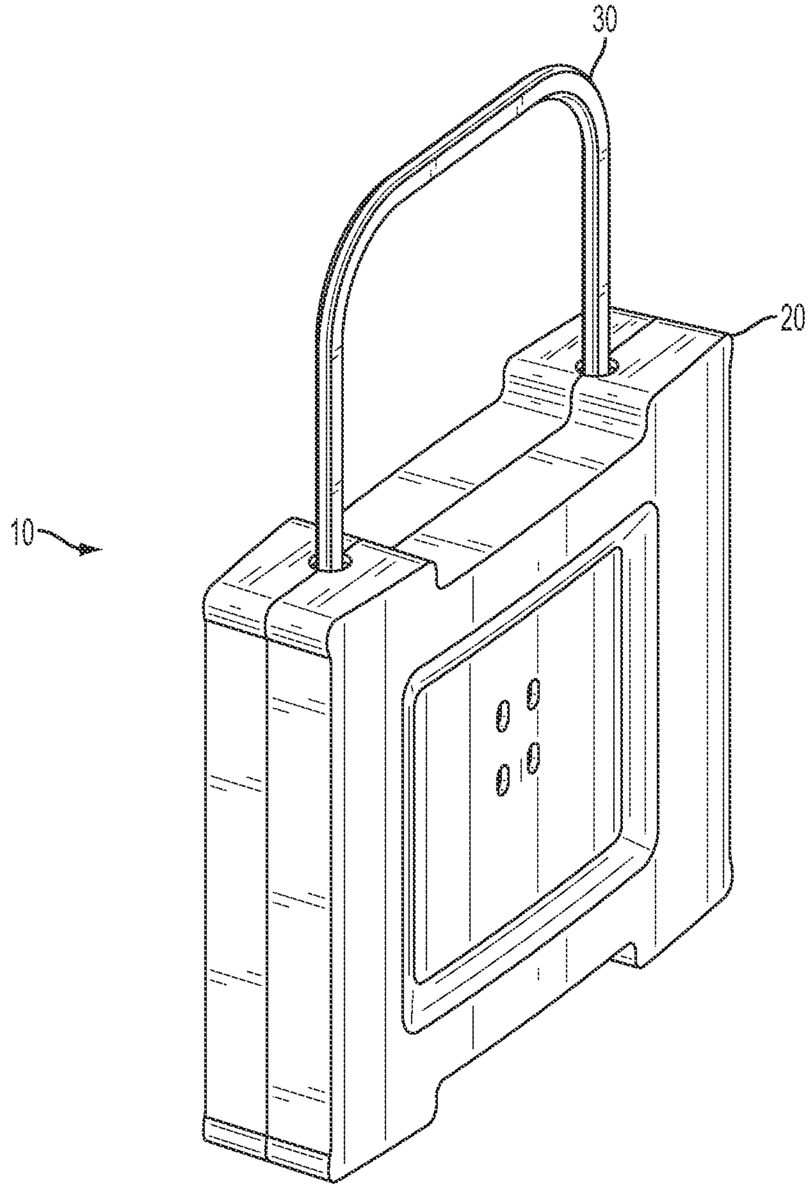
FIG. 1 is a perspective view of an EAS tag having a housing and a shackle.
Figure 2:
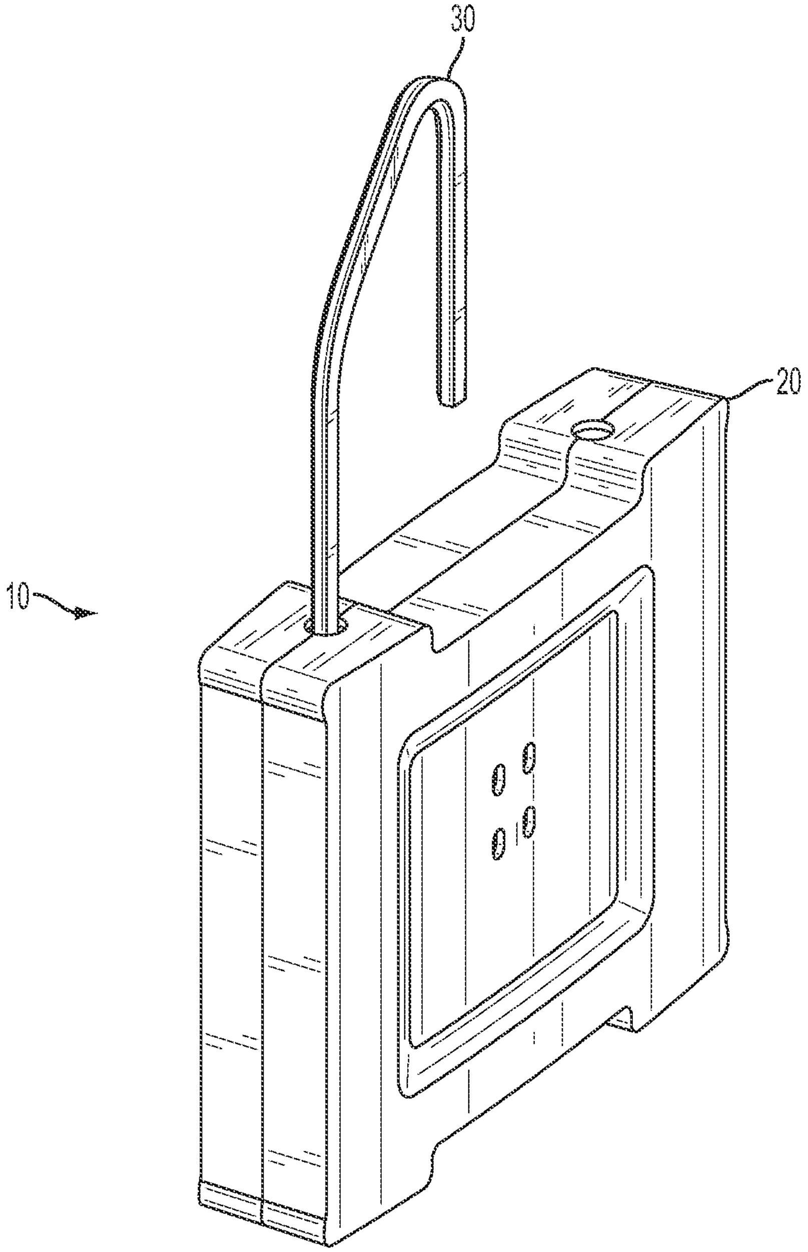
FIG. 2 shows the EAS tag of FIG. 1 with one end of the shackle disengaged from the housing.

FIG. 1 is a perspective view of an EAS tag 10 having a housing 20 and a shackle 30. In FIG. 1, both ends of shackle 30 are engaged in housing 20. FIG. 2 is a perspective view of the EAS tag 10 of FIG. 1. However, in FIG. 2, one end of shackle 30 is disengaged from housing 30. When shackle 30 is thus disengaged from housing 20, shackle 30 can be inserted through the aperture of an object to be monitored or around a portion of an object to be monitored. The disengaged end of shackle 30 can then be engaged in housing 20 to secure EAS tag 10 to the object. A releasable clutch within housing 20 maintains shackle 30 engaged to housing 20.

Figure 3:
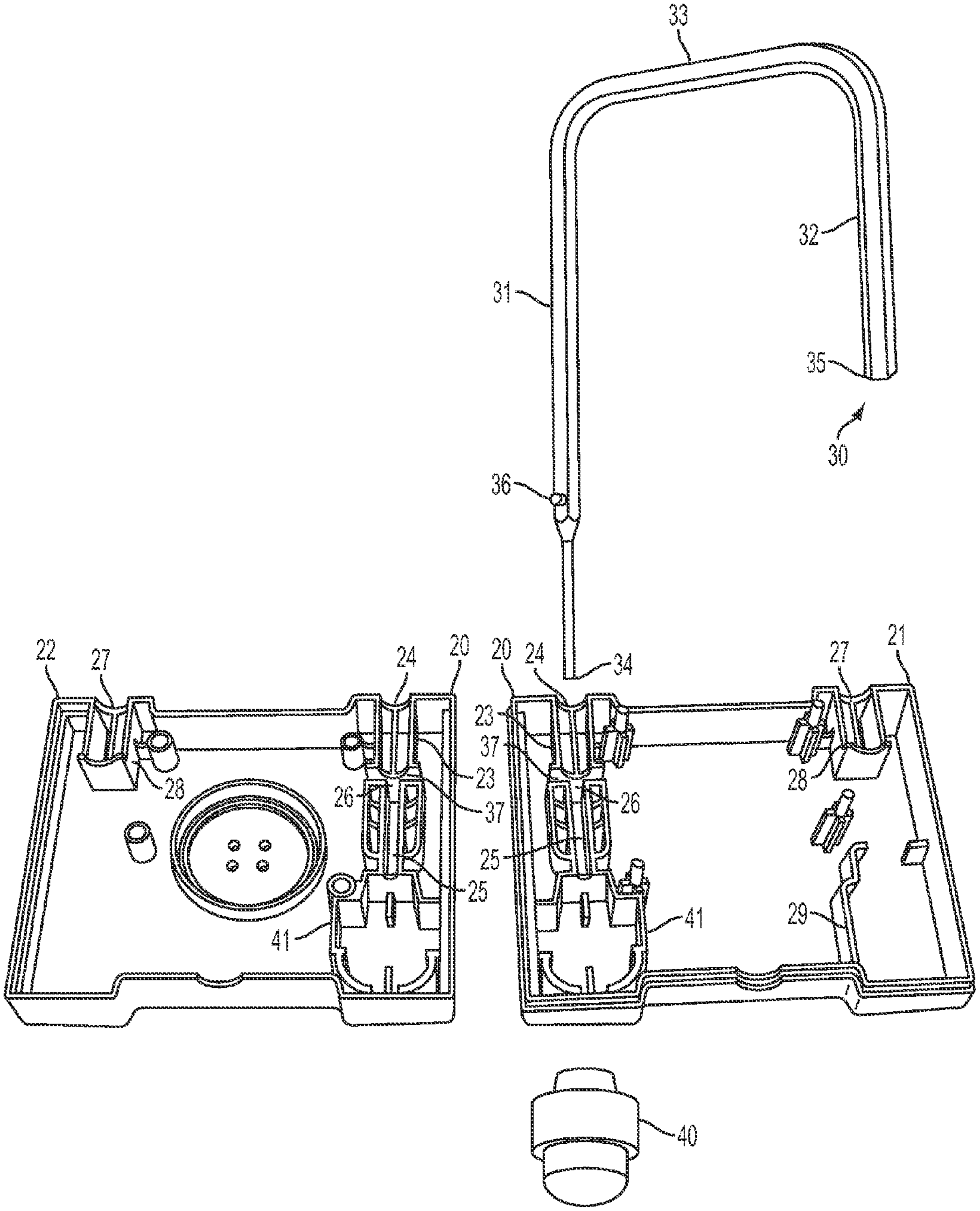
FIG. 3 shows the housing of the EAS tag separated into two portions with the shackle and a clutch separated from the housing.

FIG. 3 shows housing 20 of the EAS tag 10 separated into two portions, back portion 21 and front portion 22, with shackle 30 and clutch 40 separated from housing 20. Shackle 30 has a first end 34 and a second end 35. In the embodiment shown in FIG. 3, first end 34 is on the end of first segment 31 and second end 35 is on the end of second segment 32 with an intermediate segment 33 between first segment 31 and second segment 32. In the embodiment shown in FIG. 3, first end 34 is reduced in cross section compared to the rest of shackle 30 and first segment 31 has cross pins 36 extending from the section with a larger cross section proximal to the transition from larger cross section to smaller cross section.

It may be seen in FIG. 3 that back portion 21 and front portion 22 are symmetrical with respect to several features in their interiors. Among these are features which combine to form shackle guide 23, guide aperture 24, pin guide 25, shackle receiver 28, receiver aperture 27, and clutch retainer 41, when back portion 21 and front portion are assembled. Other features on the interior surface of back portion 21 and front portion 22 are unique to one or the other portions.

Figure 4:
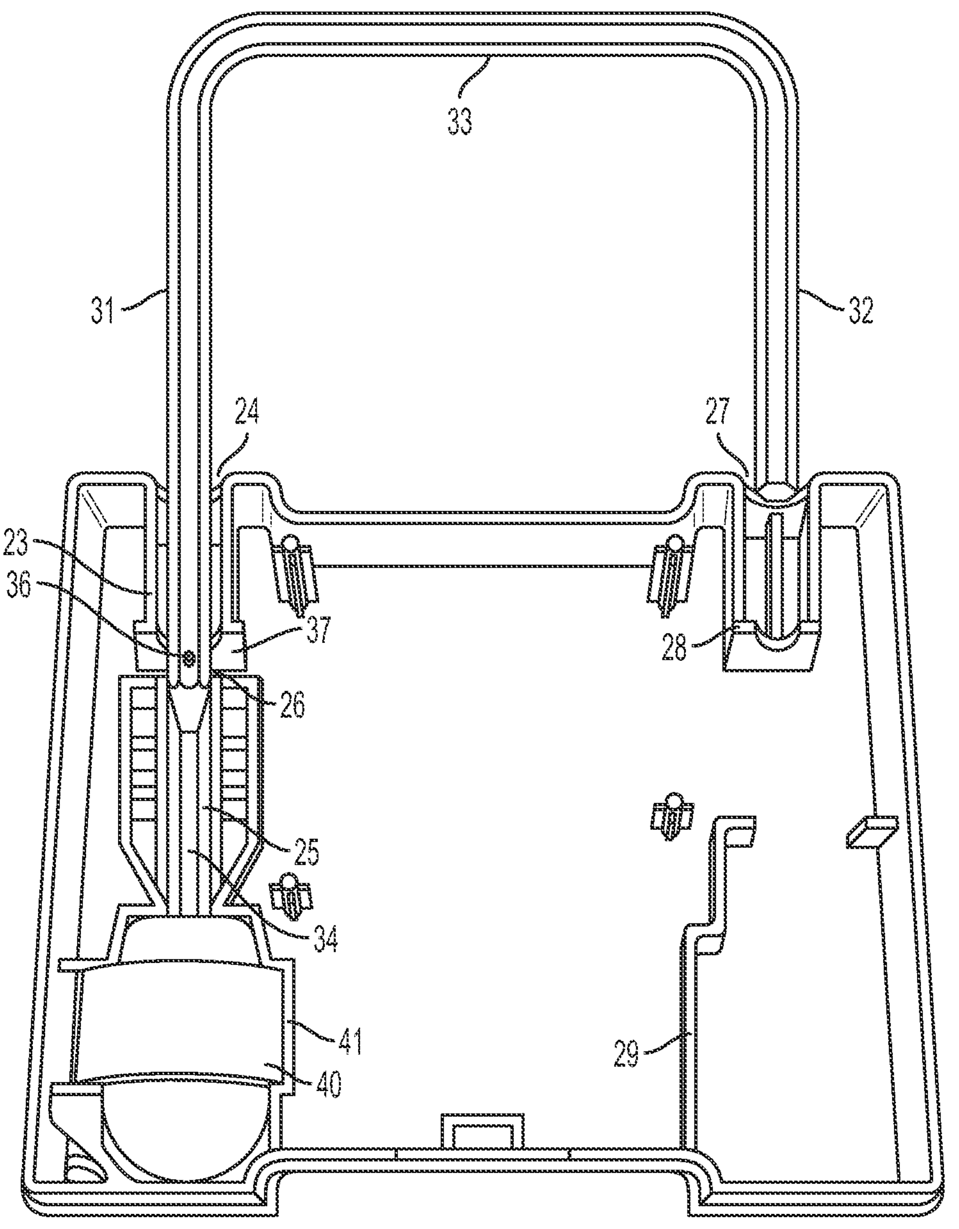
FIG. 4 shows the back portion of the housing of the EAS tag with the shackle and a clutch in position in the back portion of the housing with one end of the shackle disengaged from the housing.

FIG. 4 shows back portion 21 of housing 20 of EAS tag 10 with shackle 30 and clutch 40 in position in back portion 21 of housing 20. In FIG. 4, first segment 31 of shackle 30 is slidably engaged in shackle guide 23 in back portion 21, while second segment 32 of shackle 30 is disengaged from back portion 21 of housing 20. Clutch 40 is positioned below first end 34 of first segment 31 and is maintained in position by clutch retainer 41. First end 34 is reduced in cross section compared to the rest of shackle 30 in order for first end 34 to fit into clutch 40. First end 34 may also be called pin 34, because of its reduced size. Other embodiments may employ a shackle having a smaller cross section along its length or a clutch capable of accommodating a thicker shackle end.

In FIG. 4, the thicker portion of first segment 31 rides in shackle guide 23 which extends from guide aperture 24 at the top of back portion 21 partially into the interior of back portion 21. Cross pins 36 ride in pin guides 25 which are slots formed by raised features in the interior of back 21 and front 22 portions of housing 20. When shackle 30 is extended from housing 20, cross pins 36 align with swivel gap 26 which is a gap between shackle guide 23 and pin guide 25. With shackle 30 positioned where cross pins 36 align in swivel gap 26, shackle 30 can rotate about first segment 31. Shackle guide 23 terminates at blocking panel 37 which abuts the interior surface of back portion 21 of housing 20. By blocking cross pins 36, blocking panel 37 prevents shackle 30 from being pulled from housing 20.

Figure 5:
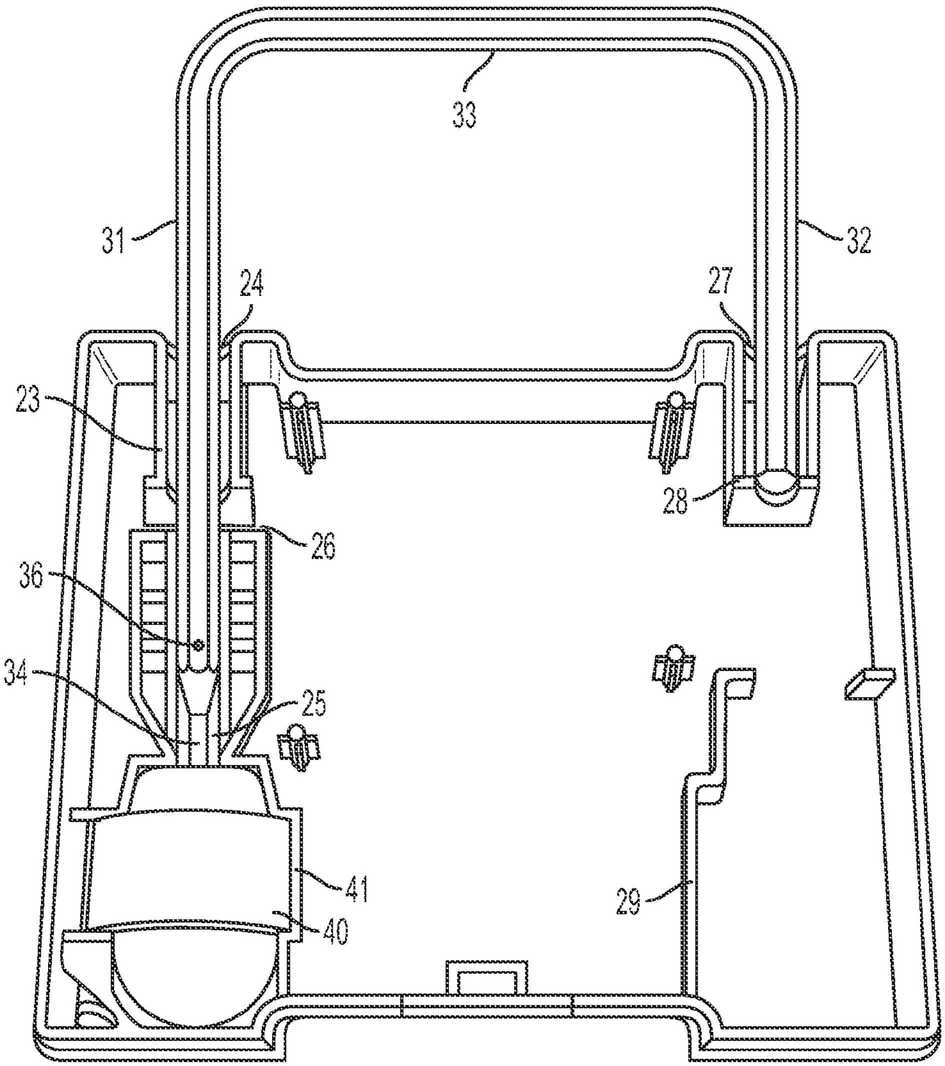
FIG. 5 shows the back portion of the housing of the EAS tag with the shackle and a clutch in position in the back portion of the housing with both ends of the shackle located within the back portion of the housing.

FIG. 5 shows back portion 21 of housing 20 of EAS tag 10 with shackle 30 and clutch 40 in position in back portion 21 of housing 20 with both ends 34 and 35 of shackle 30 located within back portion 21 of housing 20. Shackle 30 has been moved downward into back portion 21 and second end 35 of shackle 30 is inserted through receiver aperture 27 at the top of back portion 21 of housing 20 into shackle receiver 28. One of cross pins 36 is constrained by pin guide 25 and first end 34 of shackle 30 is inserted into clutch 40, which, until it is released, prevents shackle 30 from being moved upward in housing 20. This retains EAS tag 10 on an object to be monitored and protected by preventing the extraction of second end 35 of shackle 30 from shackle receiver 28 in housing 20. Clutch 40 may be release by application of a magnet to housing 20 beneath clutch 40. Clutch 40 may be a magnetically releasable ball clutch as is known in the field of EAS systems and tags.

As discussed above with respect to FIG. 4, when first end 34 of shackle 30 is released from clutch 40, shackle 30 can be moved upward until cross pins 36 reach swivel gap 26. In that position, shackle 30 can be turned about first segment 31. However, if second end 35 is not aligned with shackle receiver 28, cross pins 36 do not align with pin guide 25. Rather cross pins 36 act as a support feature to support shackle 30 on the supporting shoulder elements around the top of pin guide 25. This prevents first end 34 of shackle 30 from being inserted into clutch 40 when second end 35 is not aligned with shackle receiver 28 of housing 20.

Although the embodiments of EAS tag 10 shown in FIGS. 1-5 illustrate a rigid shackle 30 having a first segment 31 with a first end 34 parallel to a second segment 32 with a second end 35 and an intermediate section 33 between first segment 31 and second segment 32, other configurations for a shackle are possible. For example, there could be a joint between some adjoining set of segments. For another embodiment of shackle 30, shackle 30 could be a single straight piece with first end 31 and second end 32 being at opposing ends. For such a shackle, housing 20 would have receiver aperture 27 axially aligned with guide aperture 24, and shackle receiver 28 would allow shackle 30 to slide through it, so that first end 34 could be fully withdrawn from guide aperture 24, leaving a gap for installation of EAS tag 10 to an object. Further, in yet another embodiment of shackle 30 and housing 20, first segment 31 and second segment 32 of shackle 30 could be at an angle with each other rather than parallel or in alignment. For shackles such as these, the shackle receiver in housing 20 would be a notch. Pivoting the shackle about the first segment would place the second segment of the shackle at the top of the notch, while inserting the first end of the shackle in the clutch would move the second segment of the shackle into the notch. As for the material of the shackle, it is believed that most embodiments will be made of a hard material such as a metal in order to resist cutting or other physical attacks. However, other materials may be used for certain embodiments and applications.

Figure 6:
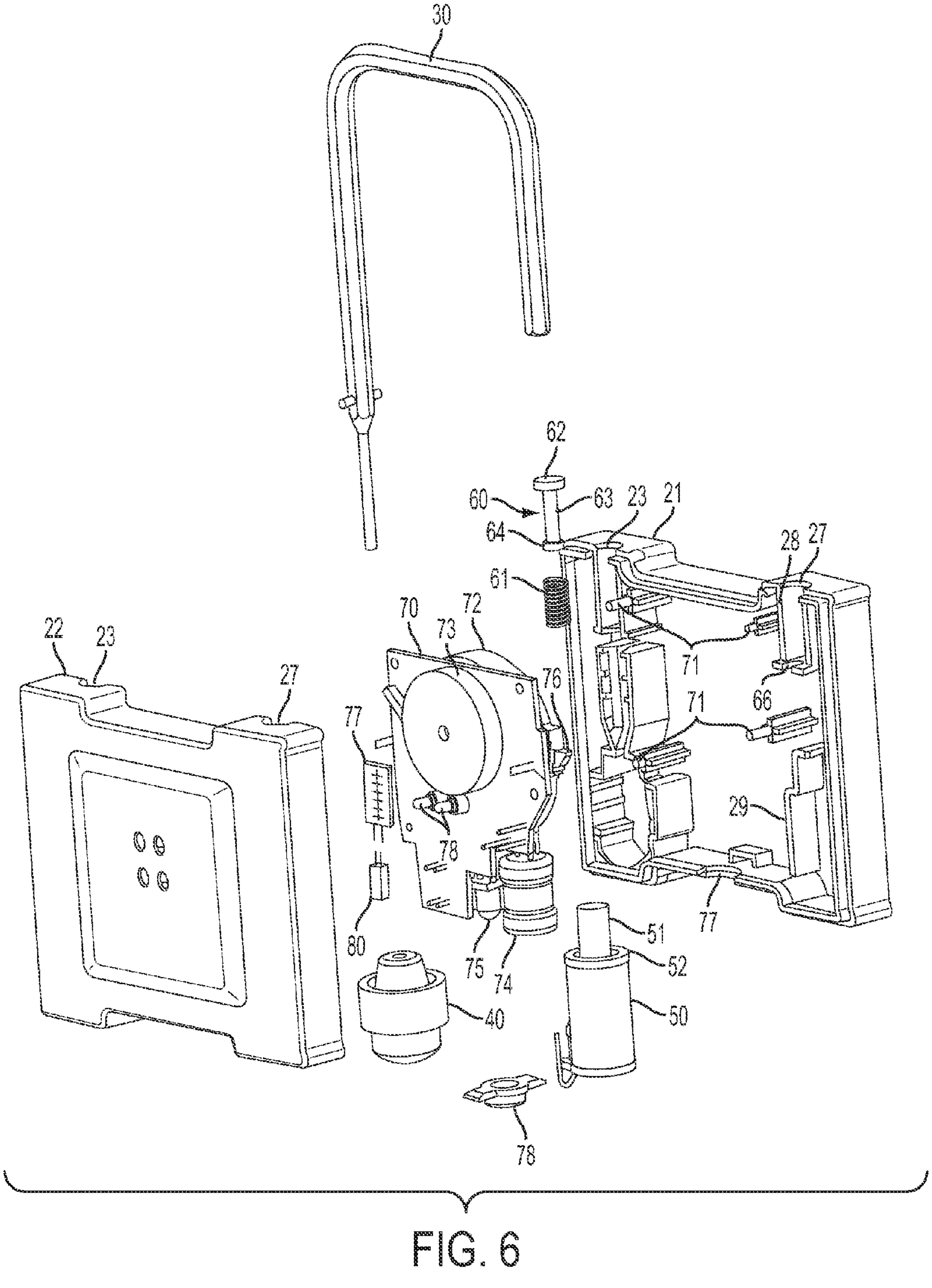
FIG. 6 is an exploded front perspective view of an EAS tag showing the shackle along with other elements in the housing.
Figure 7:
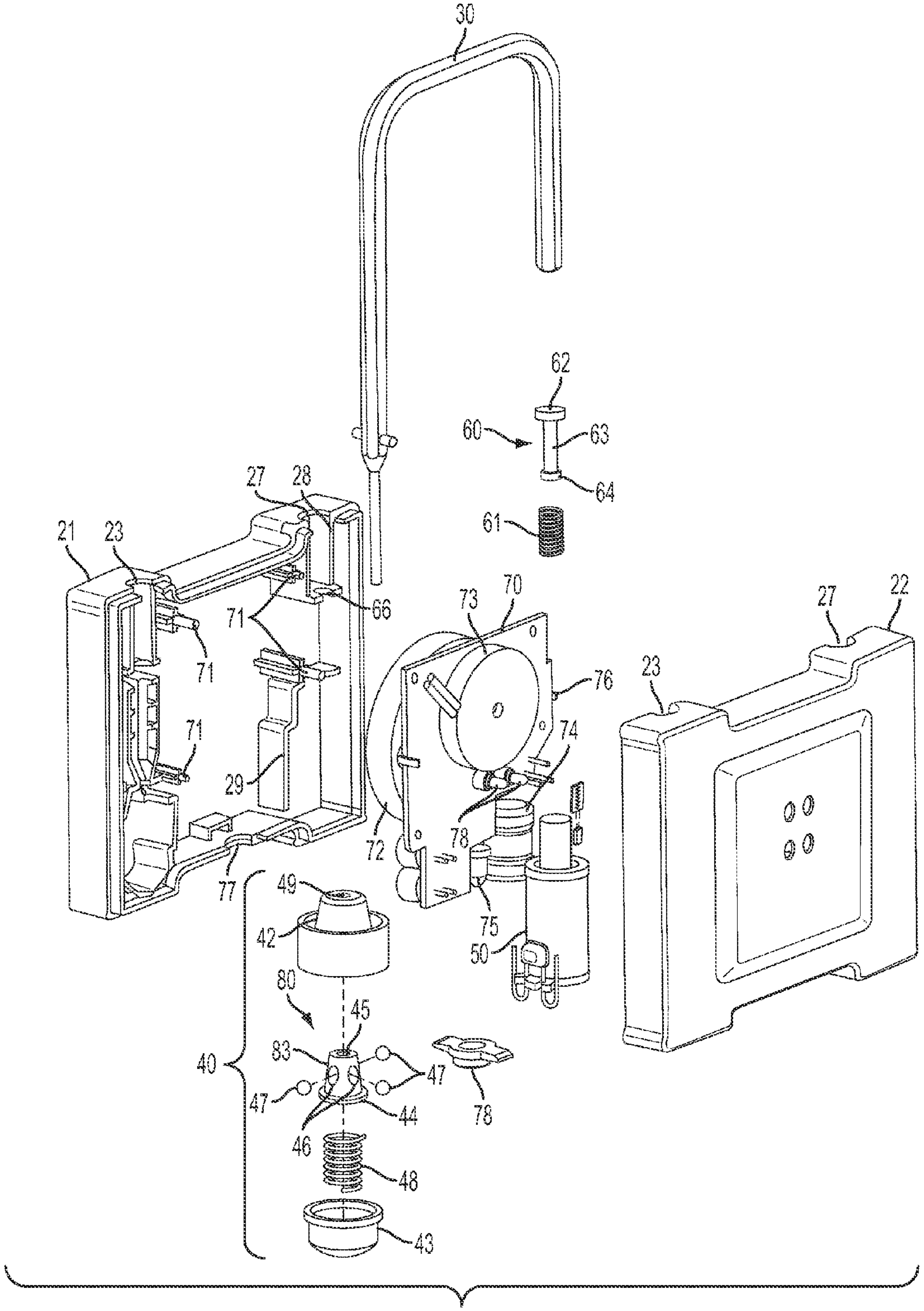
FIG. 7 is an exploded front perspective view from the other side of the EAS tag of FIG. 6.

An additional housing feature, sensor retainer 29, can be seen in FIGS. 3, 4, and 5. Turning now to FIGS. 6 and 7, passive sensor 50 may be seen in sensor retainer 29. In the embodiment shown in FIGS. 6 and 7, passive sensor 50 is of the type comprising ferrite core 51 surrounded by electrical coil 52. When front portion 22 and back portion 21 of housing 20 are assembled, sensor retainer 29 maintains passive sensor 50 in position within housing 20. Other types of passive sensors can be used and the contour of sensor retainer 29 can be changed to fit the profile of other sensors.

The exploded perspective views of FIGS. 6 and 7 show other elements which may be contained within housing 20. In the embodiments shown in FIGS. 6 and 7, shackle assist 60 and assist spring 61 are positioned beneath second end 35 of shackle 30 when EAS tag 10 is assembled. Shackle assist 60 is comprised of cap 62, shaft 63, and base 64. Shackle receiver 28 has assist aperture 66 through its bottom and shaft 63 of shackle assist 60 passes through assist aperture 66. Cap 62 of shackle assist 60 is maintained within shackle receiver 28, while base 64 of shackle assist 60 is maintained in the interior of EAS tag 10. Assist spring 61 is located beneath shackle assist 60 and biases shackle assist 60 upward. When second end 35 of shackle 30 is inserted down into shackle receiver 28, second end 35 presses shackle assist 60 down into shackle receiver 28, loading assist spring 61. When clutch 40 is released and shackle 30 is pulled, shackle assist 60 assists the movement of second end 35 of shackle 30 from shackle receiver 28. In embodiments employing additional electronics, shackle assist 60 may be associated with a switch that confirms that shackle assist 60 has be depressed, indicating that second end 35 of shackle 30 has been inserted into shackle receiver 28.

As mentioned above, some embodiments of EAS tag 10 with shackle 30 may employ additional electronics. FIGS. 6 and 7 illustrate such an embodiment. Circuit board 70 is mounted on posts 71 and provides the structure for mounting electronic elements as well as providing electrical connections among the electronic elements. Among additional electronic elements that may be contained within EAS tag 10 are microprocessor 72, sound generator 73, battery 74, optical communication port 75, switch 76, light emitting diodes 78, radio frequency communication circuitry 79, and motion detection chip 80.

Microprocessor 72 is capable of storing and executing machine readable instructions to perform logic operations. Microprocessor 72 can communicate with other devices through wireless communication elements such as radio frequency communication circuitry 79 or optical communication port 75 and LEDs 78. These other devices can include the overall EAS system, EAS tag deactivators, EAS tag programmers, etc. EAS tag programmers can reprogram the machine readable instructions stored on microprocessor 72 as well as providing logic inputs for microprocessor 72 to interpret.

Sound generator 73 can generate audible alarms when microprocessor 72 determines an alarm situation is present. This may occur when the wireless communication elements detect that EAS tag 10 is present in an unauthorized area such as an interrogation zone at the exit of an establishment. The wireless communication elements can also receive a signal to cease alarming which is communicated to microprocessor 72 which in turn causes sound generator 73 to cease alarming. Sound generator 73 can also communicate that EAS tag 10 has been successfully armed by beeping, etc.

When EAS tag 10 is assembled, switch 76 is positioned in proximity to shackle assist 60 to detect its position. When shackle assist 60 is depressed, switch 76 conveys this to microprocessor 72 which interprets this to mean that EAS tag 10 is attached to an object to be monitored. If shackle assist 60 changes position without a wireless communication from the EAS system to disarm it, microprocessor 72 interprets this as unauthorized removal of EAS tag 10 from the object to be monitored and determines that an alarm condition exists. Microprocessor 72 can then cause sound generator 73 to generate an audible alarm and also generate an alarm signal over the wireless communication elements.

Optical communication port 75 aligns with aperture 77 in the bottom of housing 20. LEDs 78 can generate signals for optical communication or may generate more general visual cues for users. In some embodiments, the optical communication may be done in the infrared spectrum range.

In addition to optical communication capabilities, some embodiments of EAS tag 10 may have radio frequency capabilities for wireless communication. Radio frequency communication circuitry 79 provides this capability. Radio frequency communication circuitry 79 can both transmit and receive signals for communication with other elements of the larger system.

Motion detection chip 80 can detect when EAS tag 10 is being moved and can provide an additional logic input for microprocessor 72. For example, the electronics package of EAS tag 10 may generally function at a low level of operation until motion detection chip 80 detects that EAS tag 10 is being moved. Then microprocessor 72 may change to a more active mode of operation to monitor the current situation.

In some embodiments of EAS tag 10, the electronics package more generally, or microprocessor 72 in particular, may have a clock function. This clock function can be used to change a passcode for EAS tag 10 according to a time based algorithm. This change in passcode is synchronized with the broader EAS security system. This is an added layer of security against unauthorized disarming of the electronics of EAS tag 10.

Figure 10:
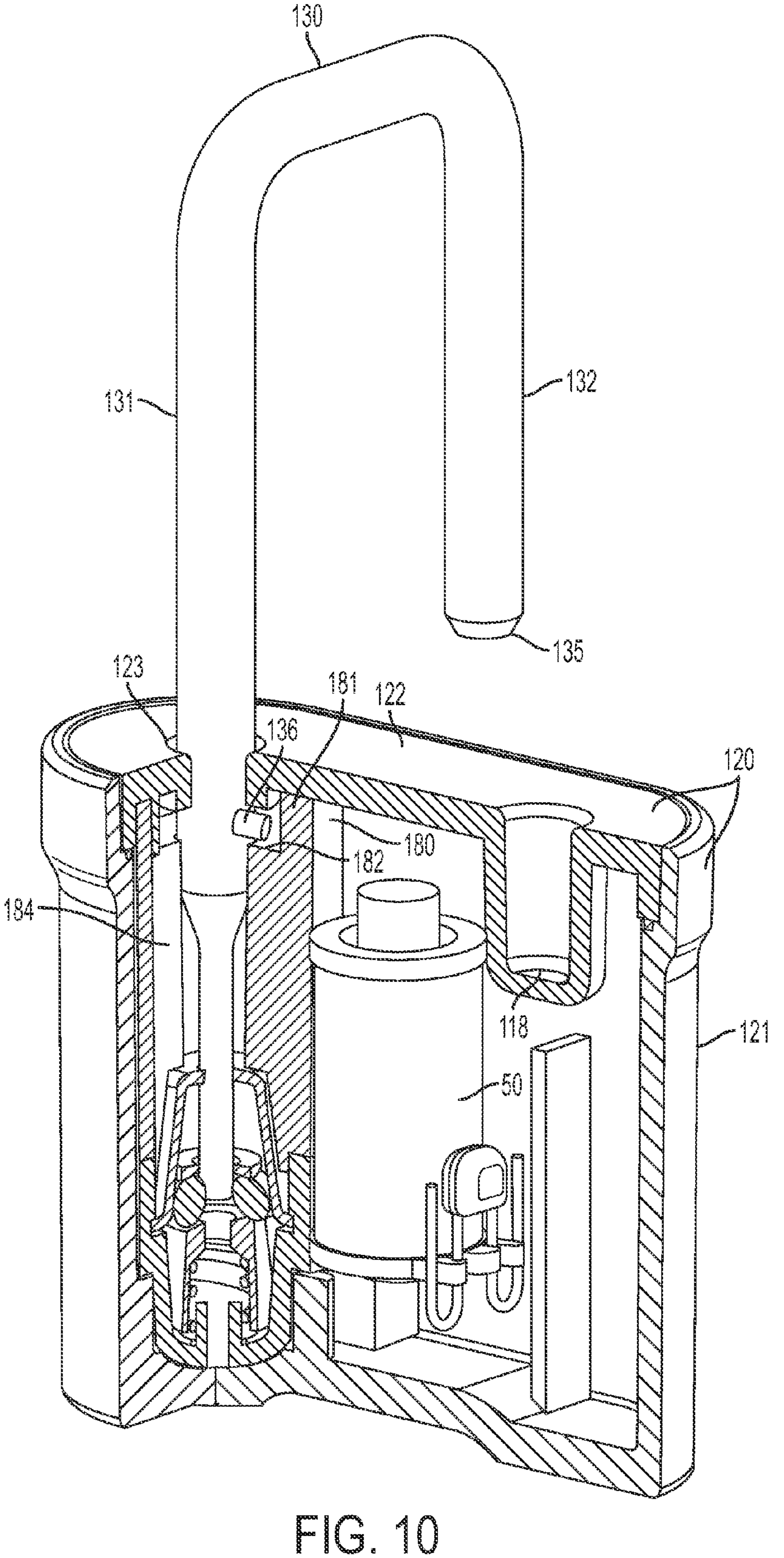
FIG. 10 is an assembled perspective view of an embodiment of the EAS tag of FIG. 6 with the housing of the tag sectioned and the shackle unengaged.
Figure 11:
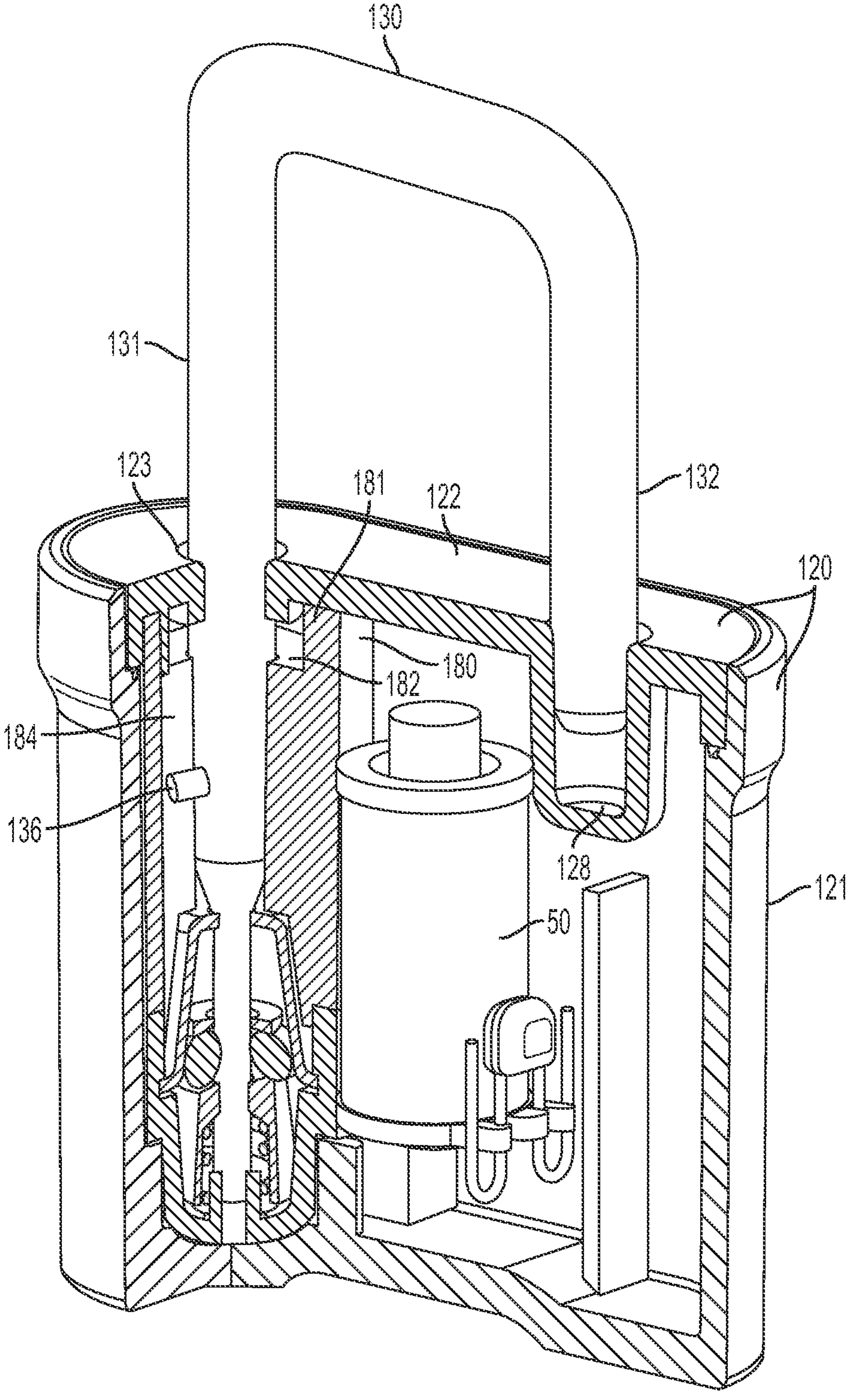
FIG. 11 is an assembled perspective view of an embodiment of the EAS tag of FIG. 6 with the housing of the tag sectioned and the shackle engaged.

FIG. 7 shows an exploded view of one embodiment of clutch 40. FIGS. 10 and 11 show sectioned views of clutch 40. The operation of clutch 40 will be described later in conjunction with FIGS. 10 and 11.

Figure 8:
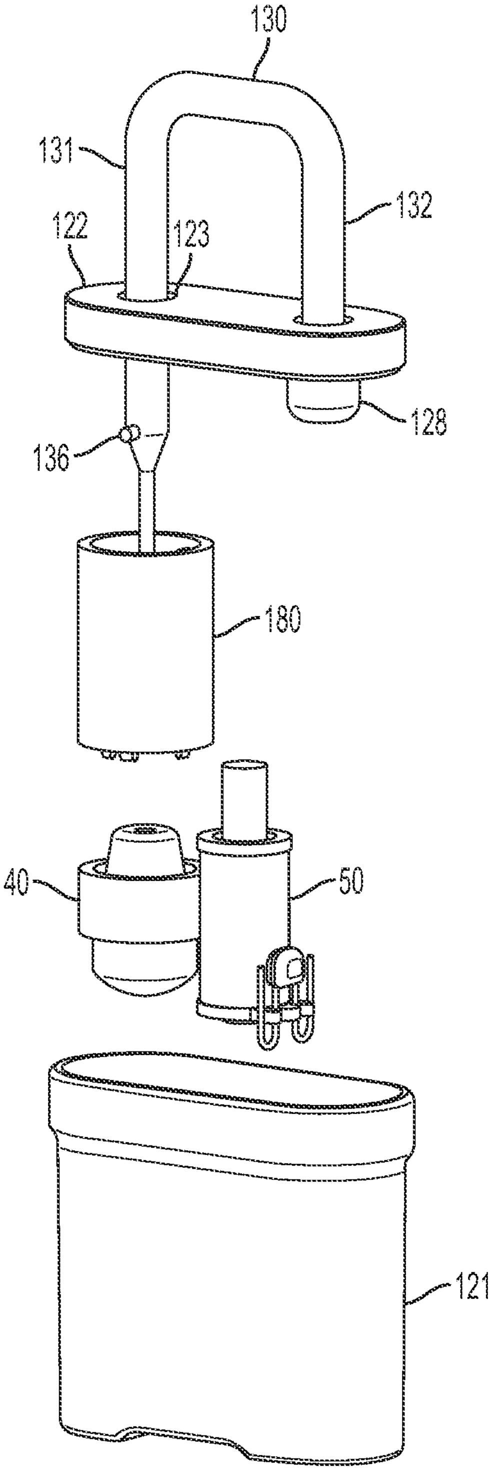
FIG. 8 is an exploded front perspective view of another embodiment of an EAS tag having a housing and shackle.

FIG. 8 is an exploded front perspective view of another embodiment of an EAS tag 110 having a housing 120 (see FIG. 10) and shackle 130. In the embodiment of FIG. 8, housing 120 of EAS tag 110 is comprised of bottom, canister portion 121 and a top 122 covering the canister portion 121. Top 122 has aperture 123 through it for the passage of first segment 131 of shackle 130. Top 122 also has shackle receiver 128 for receiving second end 135 of shackle 130 on second segment 132 of shackle 130.

Column 180, clutch 40, EAS element 50, and first segment 131 of shackle 130 are located within housing 120 of EAS tag 110 when top 122 is assembled to canister 121. In the embodiment shown in FIG. 8, EAS element 50 is a passive ferrite core and coil type of EAS element. Other types of EAS elements could be used in addition or instead. In the embodiment shown in FIG. 8, clutch 40 is a three ball clutch of the kind shown in FIGS. 6 and 7, the operation of which will been described below. Other types of clutches could also be used as well.

Figure 9:
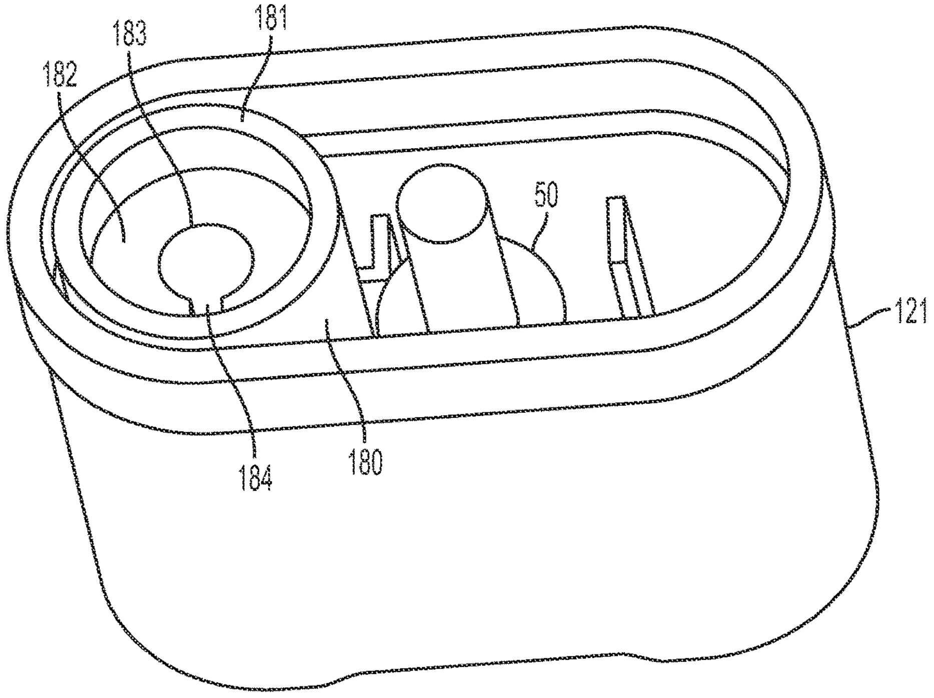
FIG. 9 is a top perspective view of a portion of the housing of the EAS tag of FIG. 8.

FIG. 9 is a top perspective view of the canister portion 121 of housing 120 of EAS tag 110 of FIG. 8. Column 180 and EAS element 50 are located within canister 121. Column 180 has rim 181 around the outer edge of its top and a slight recessed platform 182 within rim 181. Platform 182 has an aperture 183 centered in it with slot 184 running from the edge of aperture 183 toward rim 181. Referring now back to FIG. 8, first segment 131 of shackle 130 inserts into aperture 183 of column 180. Radial pin 136 extends from first segment 131 of shackle 130 and has a diameter and length such that it will fit through slot 184 when radial pin 136 is aligned with slot 184. Radial pin 136 is angularly positioned on first segment 131 of shackle 130 such that radial pin 136 will align with slot 184 when second end 135 of shackle 130 is aligned with shackle receiver 128. Otherwise, when second end 135 of shackle 130 is not aligned with shackle receiver 128, radial pin 136 will not align with slot 184. Then radial pin 136 will be constrained to go no further than platform 182 at top of column 180 will allow. This supports shackle 130 in place and prevents first end 134 on first segment 131 of shackle 130 from inserting into clutch 40 enough to be engaged by clutch 40. The radial pin 136 feature on shackle 130 and the platform 182 of the column 180 element cooperate to support shackle 130 in a position where first end 134 will not insert into clutch 40.

FIG. 10 is an assembled perspective view of an embodiment of the EAS tag 110 of FIG. 6 with housing 120 of EAS tag 110 sectioned and shackle 130 unengaged. As can be seen in FIG. 10, second end 135 of shackle 130 is not aligned with shackle receiver 128. Therefore, radial pin 136 on first segment 131 of shackle 130 is not aligned with slot 184 in column 180, so radial pin 136 rests on platform 182 on the top of column 180 and supports shackle 130 in that position. First end 134 of shackle 130 is inserted through aperture 49 in clutch 40 in FIG. 10 but not deep enough for clutch 40 to engage first end 134 of shackle 130 and retain first end 134.

FIG. 11 is an assembled perspective view of an embodiment of the EAS tag 110 of FIG. 6 with housing 120 of tag 110 sectioned and shackle 130 engaged by clutch 40. In FIG. 11, second end 135 of shackle 130 is aligned with shackle receiver 128. This aligns radial pin 136 with slot 184 in column 180 which allows shackle 130 to insert deeper into housing 120 of EAS tag 110. Second end 135 of shackle 130 inserts into shackle receiver 128 and first end 134 of shackle 130 inserts deep enough into clutch 40 for clutch 40 to engage first end 134 and retain first end 134. This retains shackle 130 at its deeper insertion with second end 135 of shackle 130 in shackle receiver 128, forming a closed loop which maintains EAS tag 110 on an object being protected.

Referring back to FIG. 7, an exploded view of clutch 40, similar to clutch 40 of FIGS. 10 and 11, is shown. The exploded view of clutch 40 of FIG. 7 and the section views of clutch 40 of FIGS. 10 and 11 more clearly show how clutch 40 works. Cup 42 and cap 43 of clutch 40 form a container for the internal working elements of clutch 40. Spindle 44 has a hollow central axis 45 and apertures 46 leading from the hollow central axis 45 of spindle 44 to the exterior surface of spindle 44. Cup 42 is tapered and an aperture 49 in cup 42 aligns with the hollow central axis 45 of spindle 44. Balls 47 are located within apertures 46 in spindle 44 and spring 48 beneath spindle 44 in cap 43 drives spindle 44 up into tapered cup 42. First end 134 of shackle 130, aperture 49 in cup 42, and hollow central axis 45 in spindle 44 are sized so that first end 134 of shackle 130 can insert through aperture 49 in cup 42 and into hollow central axis 45 in spindle 44. When first end 134 is inserted into clutch 40, it pushes balls 47 and spindle 44 down, separating balls 47. When first end 134 is attempted to be removed, balls 47 create a wedging effect between tapered cup 42 and first end 134. Cup 42, first end 134, and balls 47 are sized to create this wedging effect.

Spindle 44 is at least partially made of a magnetically attractable material. Application of a magnet to canister 121 beneath clutch 40 pulls spindle 44 down away from cup 42. This moves balls 47 down into a wider section of cup 42 removing the wedging effect and allowing the withdrawal of first end 134 from engagement with balls 47.

Although specific embodiments of the invention have been described with specificity, the embodiments described should not be considered exhaustive of the possible embodiments of the invention and should not be held as limiting the scope and range of the claims. Similarly the drawings are not exhaustive depictions of embodiments of the invention and the abstract is intended to allow a person to quickly gain the general field of the invention and should not be taken as limiting the scope of the claims. Both the shackle and housing could vary to create additional embodiments.

I claim:

1. An electronic article surveillance (EAS) tag comprising:
- a shackle, said shackle having a first end and a second end;
- a housing enclosing electronic article surveillance (EAS) electronics and a releasable clutch, said housing comprising an aperture and a shackle receiver, said aperture allowing said first end of said shackle to be inserted through said aperture into said releasable clutch and said shackle receiver receiving said second end of said shackle.

2. The EAS tag of claim 1, wherein:
- said first end of said shackle is on a first segment of said shackle and said second end of said shackle is on a second segment of said shackle, said first segment of said shackle being parallel to said second segment of said shackle, said first segment of said shackle being connected to said second segment of said shackle by an intermediate section.

3. The EAS tag of claim 1, wherein:
- said first segment of said shackle is longer than said second segment of said shackle.

4. The EAS tag of claim 1, wherein:
- said EAS electronics comprise a passive EAS element.

5. The EAS tag of claim 4, wherein:
- said passive EAS element is a ferrite core and coil element.

6. The EAS tag of claim 1, wherein:
- said EAS electronics comprise a microprocessor, wireless communication elements and an onboard power supply.

7. The EAS tag of claim 6, wherein:
- said wireless communication elements comprise radio frequency transmitting and receiving circuitry, said radio frequency transmitting and receiving circuitry wirelessly transmitting an electronic article surveillance signal to external of said housing.

8. The EAS tag of claim 6, wherein:
- said wireless communication elements comprise optical communication elements.

9. The EAS tag of claim 8, wherein:
- said optical communication elements operate in the Infrared spectrum and transmit an Infrared signal.

10. The EAS tag of claim 6, wherein:
- said EAS electronics further comprise a switch in proximity to said shackle receiver, said switch changing state when said second end of said shackle is inserted into said shackle receiver.

11. The EAS tag of claim 6, wherein:
- said EAS electronics further comprise an audible signal generator.

12. The EAS tag of claim 1, further comprising:
- a support element within said housing, and a support feature extending radially from said shackle;
  - said support feature on said shackle abutting on said support element when said second end of said shackle is not aligned with said shackle receiver and preventing said first end of said shackle from being inserted into said releasable clutch;
  - said support element comprising a slot, said support feature on said shackle aligning with said slot in said support element when said second end of said shackle is aligned with said shackle receiver, said support feature fitting through said slot in said support element to allow said first end of said shackle to be inserted into said releasable clutch.

13. The EAS tag of claim 12, wherein:
- said support element comprises a column positioned over said releasable clutch, said column having a top surface with an aperture in it for insertion of said first end of said shackle, said slot adjoining said aperture in said top surface of said column.

14. The Eas tag of claim 1, wherein:
- said releasable clutch is a ball clutch.

15. The EAS tag of claim 1, wherein:
- said releasable clutch is releasable by application of a magnet to said housing in proximity to said clutch.

16. An electronic article surveillance (EAS) tag comprising:
- a shackle, said shackle having a first end and a second end;
- a releasable clutch, said releasable clutch having a shackle aperture;
- electronic article surveillance (EAS) electronics, said EAS electronics transmitting a wireless EAS signal from said EAS tag; and
- a housing enclosing said EAS electronics and said releasable clutch, said housing comprising a clutch aperture and a shackle receiver, said shackle aperture of said releasable clutch aligning with said clutch aperture of said housing;
- said first end of said shackle inserting through said clutch aperture of said housing and into said shackle aperture of said releasable clutch;
- said shackle receiver receiving said second end of said shackle when said first end of said shackle inserts into said shackle aperture of said releasable clutch.

17. The EAS tag of claim 16, wherein:
- said wireless EAS signal is a radio signal.

18. The EAS tag of claim 17, wherein:
said EAS electronics comprise a passive EAS element.
19. The EAS tag of claim 16, wherein:
said releasable clutch is a ball clutch.
20. The EAS tag of claim 19, wherein:
said releasable clutch is releasable by application of a magnet to said housing in proximity to said releasable clutch.

* * * * *